(12) United States Patent
Wu

(10) Patent No.: US 8,796,929 B2
(45) Date of Patent: Aug. 5, 2014

(54) DAYTIME RUNNING LAMP (DRL) CONTROL SYSTEM

(75) Inventor: Tyngyuan Wu, Taipei (TW)

(73) Assignee: O2Micro, Inc., Santa Clara, CA (US)

( * ) Notice: Subject to any disclaimer, the term of this patent is extended or adjusted under 35 U.S.C. 154(b) by 587 days.

(21) Appl. No.: 13/222,805

(22) Filed: Aug. 31, 2011

(65) Prior Publication Data

US 2013/0049585 A1 Feb. 28, 2013

(51) Int. Cl.
*B60Q 1/26* (2006.01)
*B60Q 1/00* (2006.01)
*B60Q 1/28* (2006.01)

(52) U.S. Cl.
CPC ............... *B60Q 1/28* (2013.01); *B60Q 1/0088* (2013.01); *B60Q 2400/30* (2013.01)
USPC ............................................. 315/77; 315/82

(58) Field of Classification Search
USPC .................. 315/77–80, 82, 83, 291, 307, 308
See application file for complete search history.

(56) References Cited

U.S. PATENT DOCUMENTS 6,621,406 B2 * 9/2003 Kumano ...................... 340/5.62

* cited by examiner

*Primary Examiner* — Jimmy Vu

(57) ABSTRACT

A daytime running lamp (DRL) controller for controlling power to a light source of a vehicle includes a switch, an engine starting-up detector and a switch control circuit. The switch is coupled to the light source. The engine starting-up detector is coupled to the switch, and generates a trigger signal if the engine is starting up. The switch control circuit is coupled to the switch and the engine starting-up detector, and includes a controller. The controller generates a first control signal to switch on the switch to power on the light source responsive to the trigger signal, and keeps outputting the first control signal if a holding signal is generated within a first time period after the trigger signal is received. The first time period is a time period during which the controller is reset after receiving the trigger signal.

22 Claims, 11 Drawing Sheets

DAYTIME RUNNING LAMP (DRL) CONTROL SYSTEM

BACKGROUND

According to vehicle safety regulations in some countries, such as United States, etc., a daytime running lamp (DRL) in a vehicle should be turned on during driving in order to improve safety. FIG. 1 shows a block diagram of a conventional DRL system 100 in a vehicle. As shown in the example of FIG. 1, the conventional DRL system 100 includes a DRL light source, e.g., a light emitting diode (LED) light bar 102, and a DRL controller 101 to control power to the LED light bar 102. The DRL controller 101 is coupled to an ACC power line (not shown). However, it is difficult to find the ACC power line in the vehicle and, as such, it is inconvenient to install the DRL controller 101 in the vehicle. Moreover, the DRL light source cannot be automatically turned off when position lamps (also known as parking lights) or a direction indicator lamp (also known as a turn signal) of the vehicle is activated; thus, the DRL light source might distract other drivers and keep them from noticing the activated position lamp or direction indicator lamp.

SUMMARY

Embodiments according to the present invention provide a daytime running lamp (DRL) controller for controlling power to a light source of a vehicle. In one embodiment, the DRL controller includes a switch, an engine starting-up detector and a switch control circuit. The switch is coupled to the light source. The engine starting-up detector is coupled to the switch, and generates a trigger signal if the engine is starting up. The switch control circuit is coupled to the switch and the engine starting-up detector, and includes a controller. The controller generates a first control signal to switch on the switch to power on the light source responsive to the trigger signal, and keeps outputting the first control signal if a holding signal is generated within a first time period after the trigger signal is received. The first time period is a time period during which the controller is reset after receiving the trigger signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
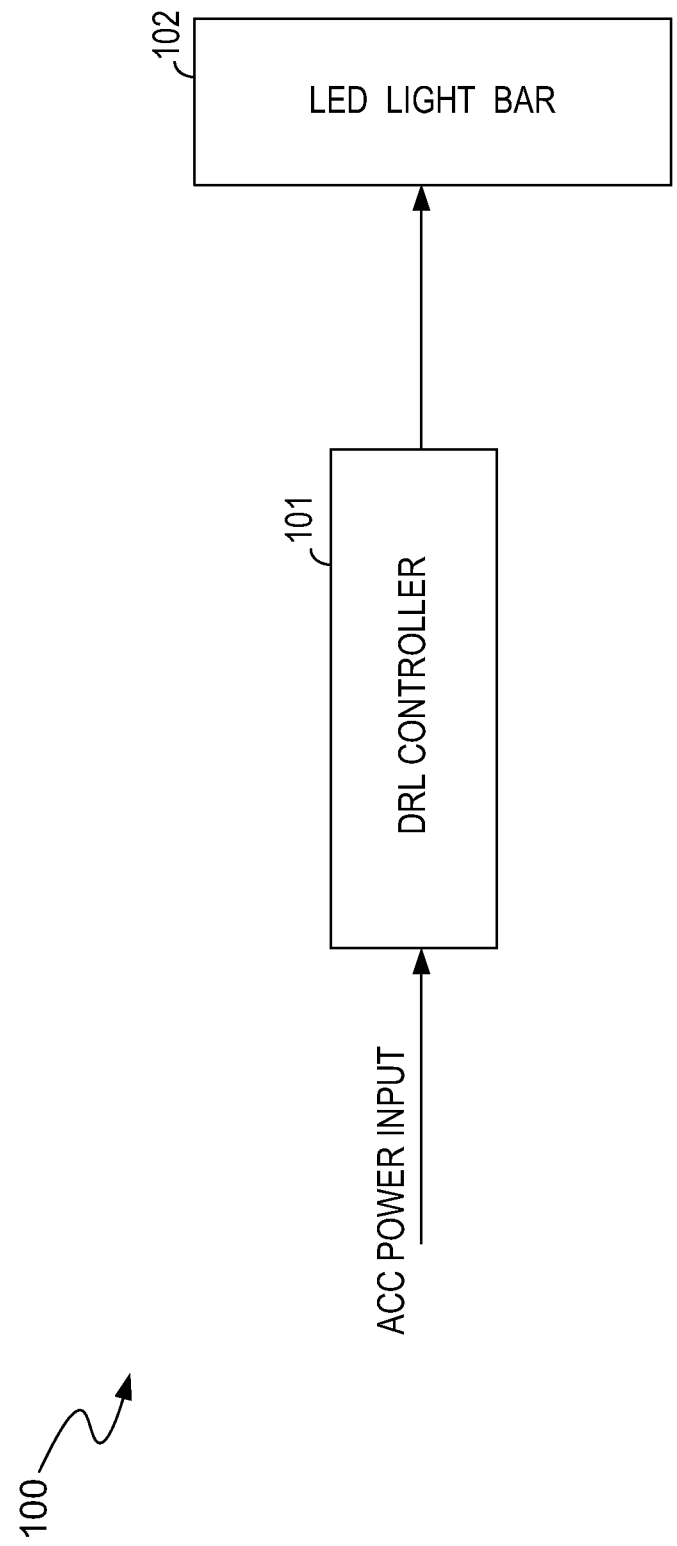
FIG. 1 shows a block diagram of a conventional daytime running lamp (DRL) system in a vehicle.
Figure 2:
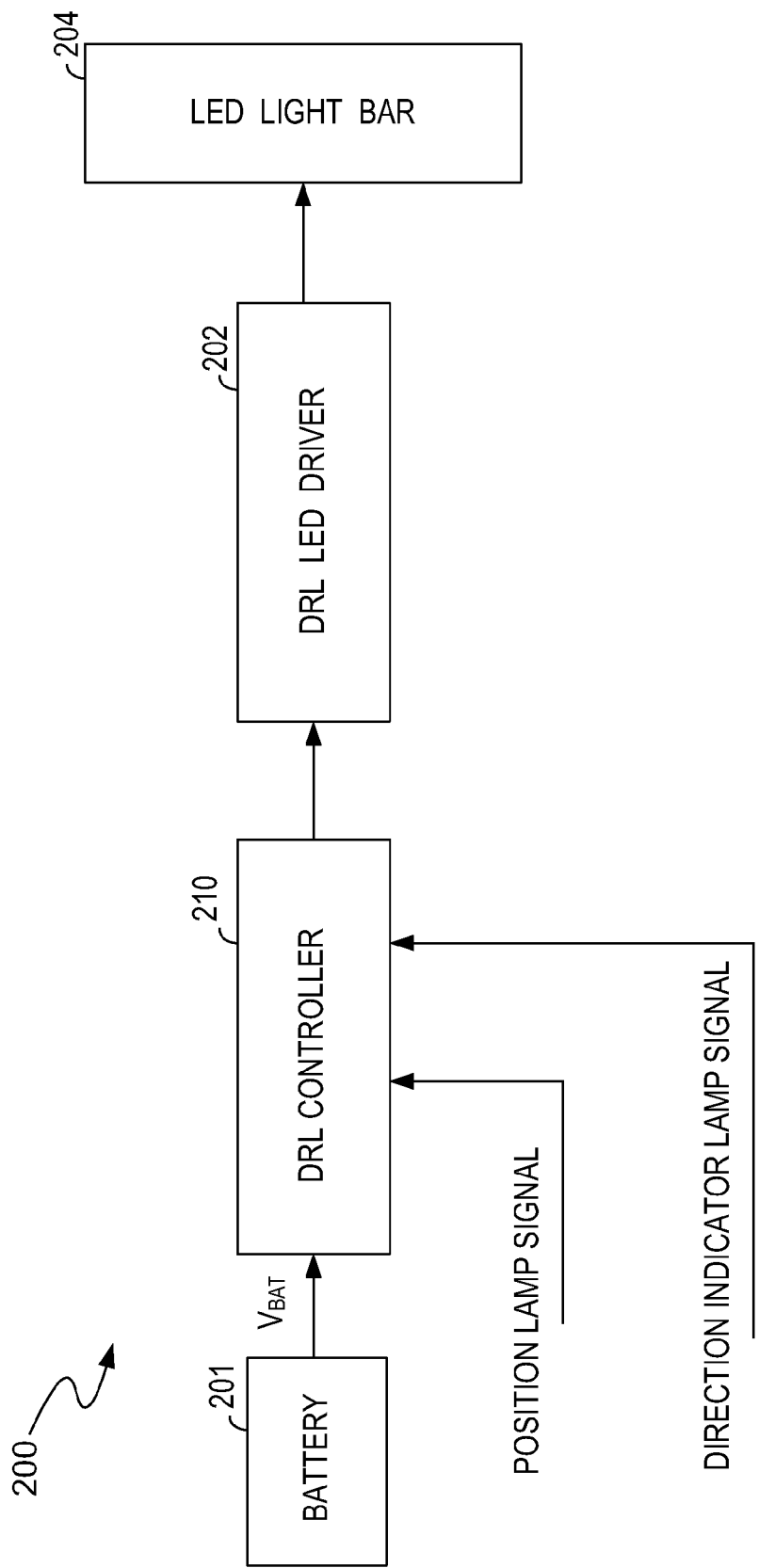
FIG. 2 shows a block diagram of an example of a DRL system, in accordance with one embodiment of present invention.

FIG. 2 shows a block diagram of an example of a daytime running lamp (DRL) system 200 for a vehicle, in accordance with one embodiment of present invention. As shown in the example of FIG. 2, the DRL system 200 includes a DRL controller 210 coupled to a battery 201, a DRL LED driver 202, and a DRL light source, e.g., a LED light bar 204. The DRL controller 210 monitors the voltage $V_{BAT}$ of the battery 201 to detect if the vehicle is starting up or is running, and controls a switch (not shown in the example of FIG. 2), which may be in the DRL controller 210, to provide power from the battery 201 to the LED light bar 204 when the vehicle is starting up or is running. The DRL LED driver 202 is coupled to the DRL controller 210 and receives power from the battery 201 via the DRL controller 210 to drive the LED light bar 204, and also can control power to the LED light bar 204 to provide, for example, dimming control for the LED light bar 204.

As shown in the example of FIG. 2, the DRL controller 210 can receive a position lamp signal from a position lamp (not shown in the example of FIG. 2) of the vehicle, and can also receive a direction indicator lamp signal from a direction indicator lamp (not shown in the example of FIG. 2) of the vehicle. In one embodiment, the position lamp signal indicates the position lamp is turned on, and the direction indicator lamp signal indicates the direction indicator lamp is turned on. The DRL controller 210 can control the switch in the DRL controller 210 to turn off the LED light bar 204 upon receiving the position lamp signal or the direction indicator lamp signal.

Advantageously, the DRL system 200 is coupled to the battery 201 of the vehicle, making it easier to install the DRL system 200 in the vehicle. Moreover, the DRL light source is automatically turned on when the vehicle is starting up or is running by detecting the voltage $V_{BAT}$ of the battery 201. In addition, by sensing the position lamp signal and the direction indicator lamp signal, the DRL light source is also automatically turned off when a position lamp or a direction indicator lamp of the vehicle is activated.

Figure 3:
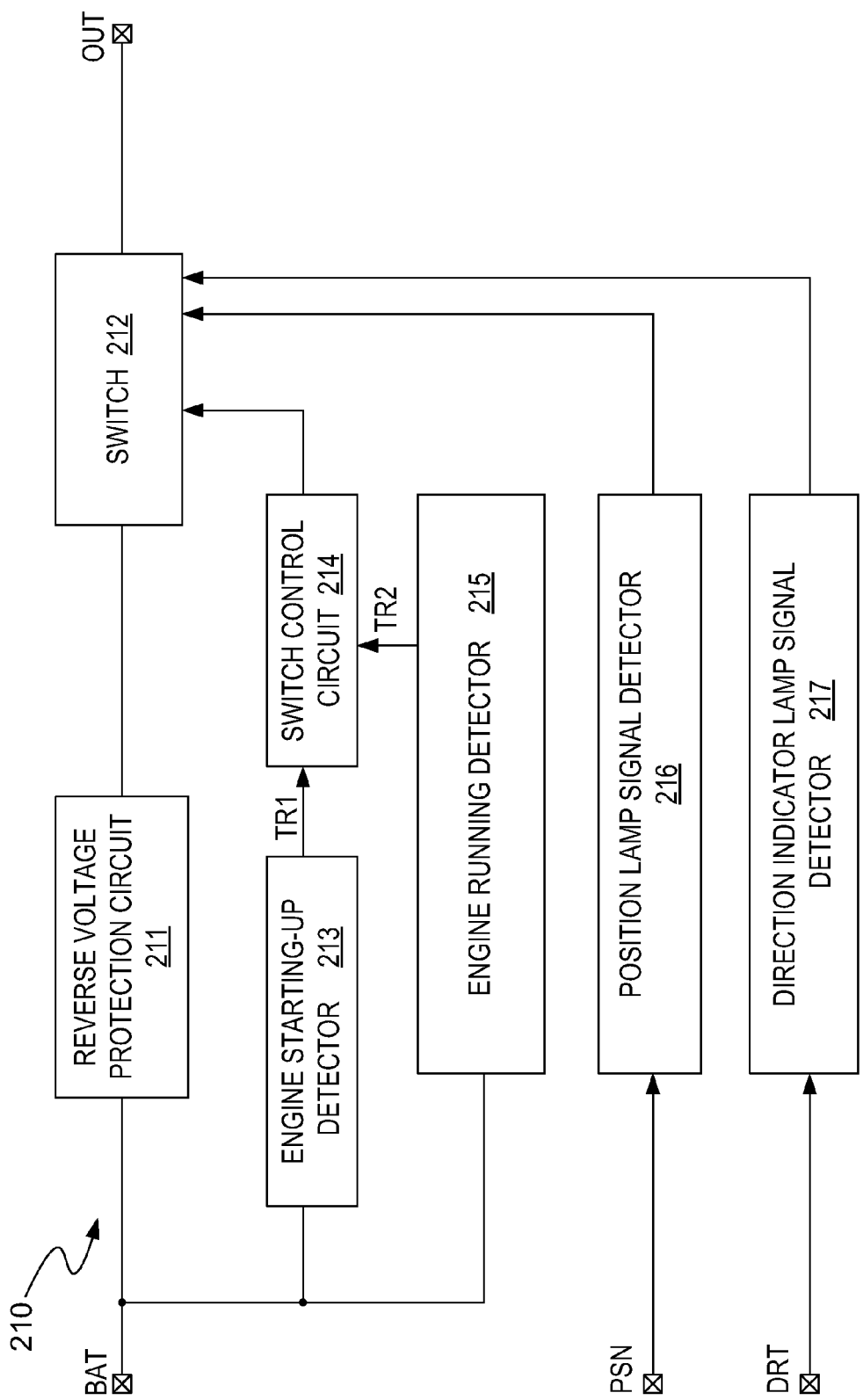
FIG. 3 shows a block diagram of an example of a DRL controller, in accordance with one embodiment of present invention.

FIG. 3 shows a block diagram of an example of a DRL controller 210 in FIG. 2, in accordance with one embodiment of present invention. FIG. 3 is described in combination with FIG. 2. As shown in the example of FIG. 3, the DRL controller 210 includes a first terminal BAT that can be coupled to the battery 201 of the vehicle, a second terminal PSN to receive the position lamp signal, a third terminal DRT to receive the direction indicator lamp signal, and a fourth terminal OUT to provide a control signal to the DRL LED driver 202 in FIG. 2 to drive the DRL light source, e.g., LED light bar 204 in FIG. 2.

The DRL controller 210 further includes a reverse voltage protection circuit 211, a switch 212, e.g., a metal-oxide-semiconductor field-effect transistor (MOSFET), an engine starting-up detector 213, a switch control circuit 214, an engine running detector 215, a position lamp signal detector 216, and a direction indicator lamp signal detector 217.

As shown in the example of FIG. 3, in one embodiment, the reverse voltage protection circuit 211 is coupled to the battery 201 and protects the DRL controller 210 in case of a reverse voltage connection. The engine starting-up detector 213 is coupled to the battery 201 via the first terminal BAT, and monitors the voltage $V_{BAT}$ of the battery 201 to detect if the engine of the vehicle is starting up. In one embodiment, when the engine is starting up, there is a relatively high voltage drop in the battery voltage $V_{BAT}$. The engine starting-up detector 213 detects the relatively high voltage drop and generates a trigger signal TR1 that indicates that the engine is starting up to the switch control circuit 214.

The engine running detector 215 as shown in the example of FIG. 3 is coupled to the battery 201 via the first terminal BAT, and monitors the voltage $V_{BAT}$ of the battery 201 to detect if the vehicle is running. In one embodiment, when the engine of the vehicle is running, there are multiple ripple voltages in the battery voltage $V_{BAT}$. The engine running detector 215 can detect the ripple voltages, and generate a holding signal TR2 to the switch control circuit 214 indicating that the vehicle is running.

The switch control circuit 214 in the DRL controller 210 can receive the signals TR1 and TR2 from the engine starting-up detector 213 and the engine running detector 215, and can generate control signals to control the switch 212 in response to the received signals. In one embodiment, upon receiving the trigger signal TR1 from the engine starting-up detector 213, the switch control circuit 214 outputs a control signal ON1 to turn on the switch 212. Thus, power is provided to the LED light bar 204 from the battery 201. In one embodiment, if the switch control circuit 214 receives the holding signal TR2 from the engine running detector 215 within a certain period of time after receiving the signal TR1, then the switch control circuit 214 can keep outputting the control signal ON1 to keep the switch 212 turned on and, as such, the LED light bar 204 remains on. Otherwise, the switch control circuit 214 generates a control signal OFF1 to turn off the switch 212. As such, the DRL light source of the vehicle is off when the engine of the vehicle does not start up or is turned off.

As shown in the example of FIG. 3, the DRL controller 210 also includes the position lamp signal detector 216. The position lamp signal detector 216 receives the position lamp signal via the second terminal PSN, and determines if the position lamp is activated by monitoring the position lamp signal. If the position lamp is activated, the position lamp signal detector 216 can generate a control signal OFF2 to turn off the switch 212. Thus, the DLR light source of the vehicle is turned off when the position lamp of the vehicle is activated.

As shown in the example of FIG. 3, the DRL controller 210 also includes the direction indicator lamp signal detector 217. The direction indicator lamp signal detector 217 receives the direction indicator lamp signal via the third terminal DRT, and determines if the direction indicator lamp is activated by monitoring the direction indicator lamp signal. If the direction indicator lamp is activated, the direction indicator lamp signal detector 217 can generate a control signal OFF3 to turn off the switch 212. Thus, the DLR light source of the vehicle is turned off when the direction indicator lamp of the vehicle is activated.

Figure 4:
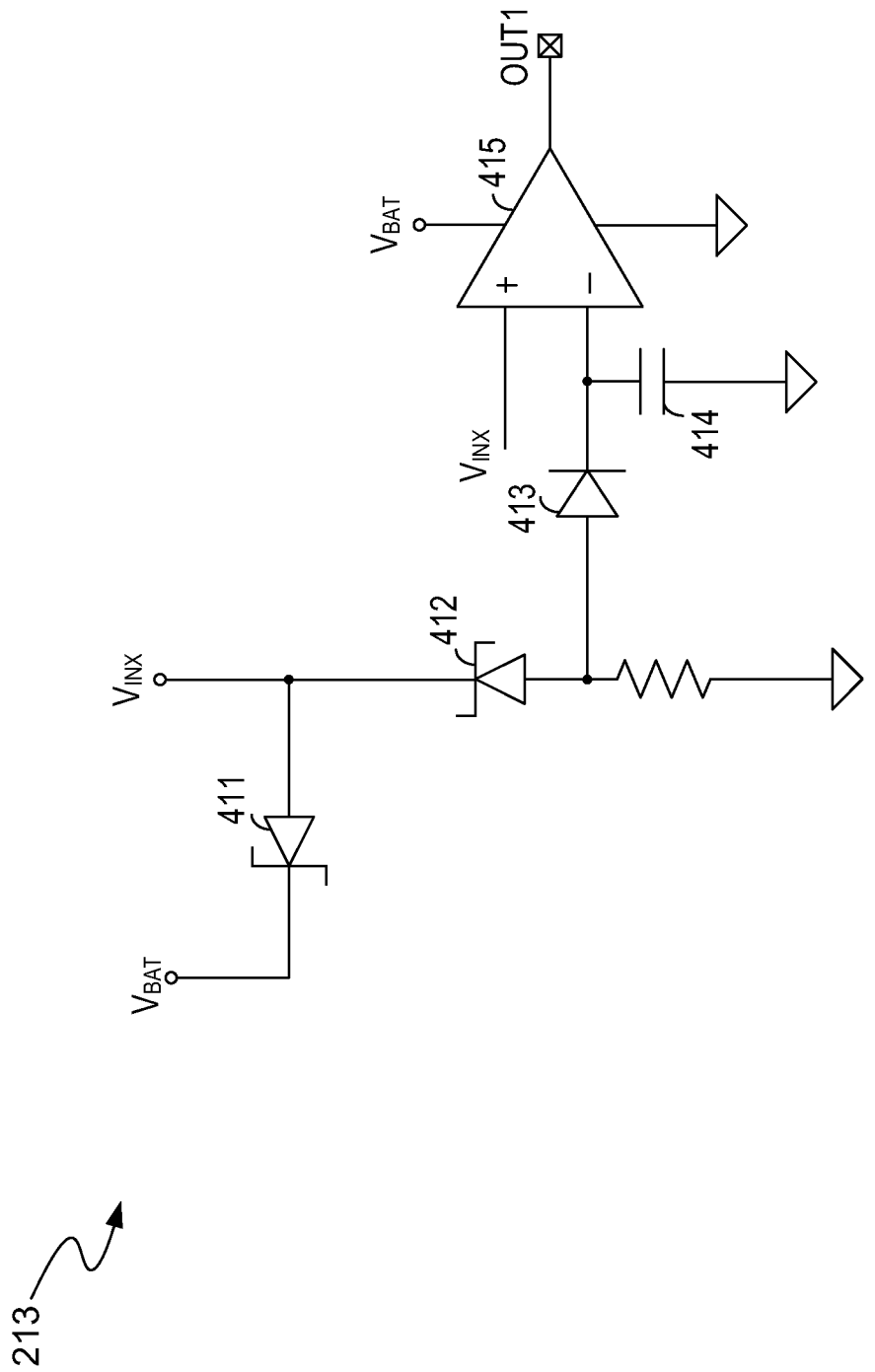
FIG. 4 shows a block diagram of an example of an engine starting-up detector in a DRL system, in accordance with one embodiment of present invention.

FIG. 4 shows a block diagram of an example of the engine starting-up detector 213 in FIG. 3, in accordance with one embodiment of present invention. FIG. 4 is described in combination with FIG. 3. As shown in the example of FIG. 4, the engine starting-up detector 213 includes diodes 411, 412, and 413, a capacitor 414, and a comparator 415. In one embodiment, diodes 411 and 412 are zener diodes, as shown in the example of FIG. 4. The engine starting-up detector 213 can receive the battery voltage $V_{BAT}$. The voltage $V_{INX}$ is a reference voltage, which can be determined by the battery voltage $V_{BAT}$. In one embodiment, the value of the voltage $V_{INX}$ can be given by equation (1):

$$V_{INX}=V_{BAT}-V_{D1} \qquad (1);$$

where $V_{D1}$ is the stable voltage provided by the zener diode 411.

In one embodiment, one terminal, e.g., the non-inverting terminal, of the comparator 415 receives the voltage $V_{INX}$. Another terminal, e.g., the inverting terminal, of the comparator 415 is coupled to the capacitor 414. In operation, the capacitor 414 can be charged until the voltage across the capacitor 414 is equal to a voltage $V_{C1}$. In one embodiment, the value of the voltage $V_{C1}$ is approximately equal to the value of voltage $V_{INX}$ at the moment of charging. As a result, the voltage $V_{C1}$ has a specific value. The comparator 415 compares the received voltage $V_{INX}$ and the voltage $V_{C1}$ across the capacitor 414. In one embodiment, when the engine is started, there is a voltage drop in the battery voltage $V_{BAT}$ in a relatively short time. Consequently, the voltage received by the non-inverting terminal of the comparator 415 also drops in a relatively short time, to less than the voltage $V_{C1}$. As a result, the comparator 415 outputs a trigger signal TR1 with a first state, e.g., logic low, via a terminal OUT1, which indicates that the engine of the vehicle has been started. The trigger signal TR1 is output to the switch control circuit 214 in FIG. 3 to further control the switch 212.

Figure 5:
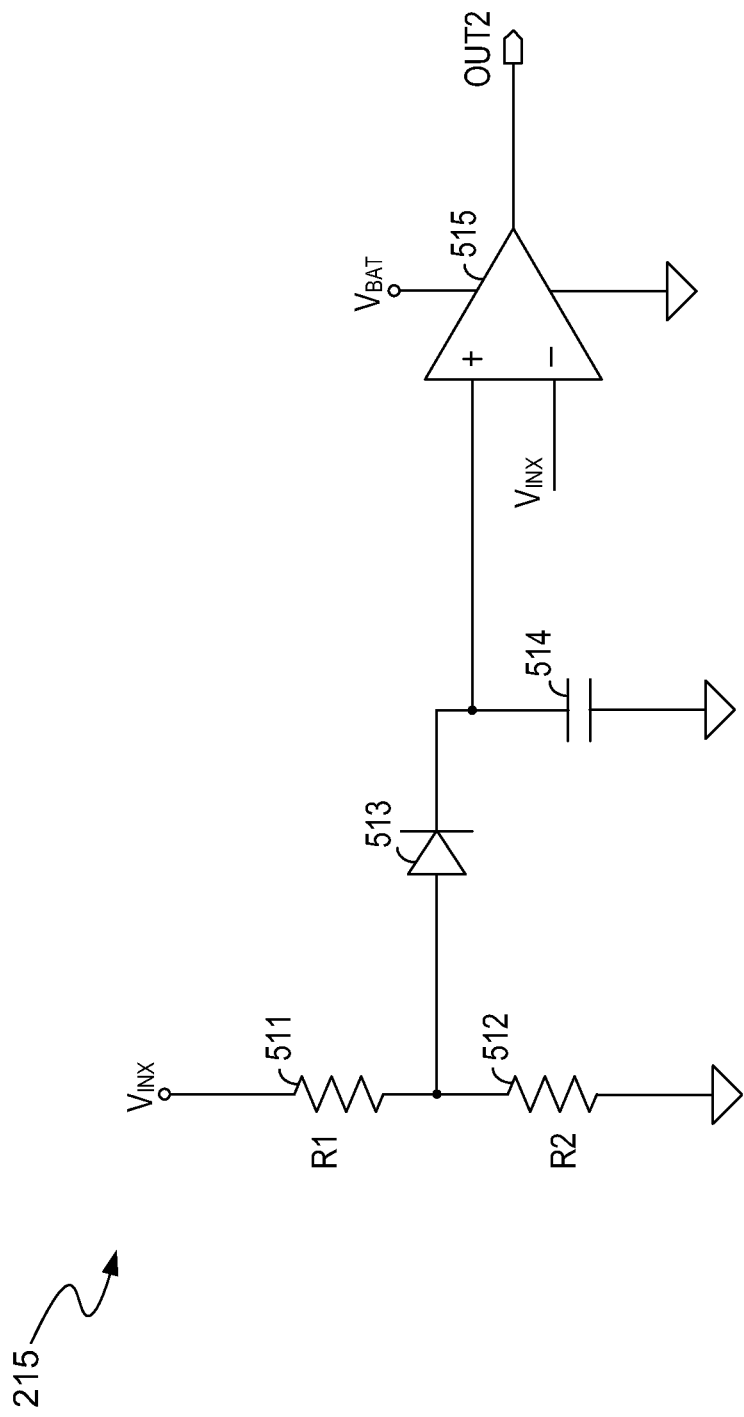
FIG. 5 shows a block diagram of an example of an engine running detector, in accordance with one embodiment of present invention.

FIG. 5 shows a block diagram of an example of the engine running detector 215 in FIG. 3, in accordance with one embodiment of present invention. FIG. 5 is described in combination with FIG. 3. As shown in the example of FIG. 5, the engine running detector 215 includes resistors R1 511 and R2 512, a diode 513, a capacitor 514, and a comparator 515. In one embodiment, one terminal, e.g., the inverting terminal, of the comparator 515 receives the voltage $V_{INX}$. Another terminal, e.g., the non-inverting terminal, of the comparator 515 is coupled to the capacitor 514. The capacitor 514 can be charged via the resistor R1 511 and the diode 513 by the voltage $V_{INX}$ until the voltage across the capacitor 514 is equal to a voltage $V_{C2}$. In one embodiment, the voltage $V_{C2}$ is given by the equation (2):

$$V_{C2}=V_{INX}*R2/(R1+R2) \qquad (2);$$

In one embodiment, $V_{INX}$ in equation (2) is the voltage at the moment of charging the capacitor 514, as a result, the voltage $V_{C2}$ has a specific value.

The comparator 515 compares the received voltage $V_{INX}$ with the voltage $V_{C2}$ to detect if the engine is running. In one embodiment, when the engine is running, there are multiple ripple voltages in the battery voltage $V_{BAT}$. The voltage $V_{INX}$ received by the inverting terminal of the comparator 515 ripples accordingly. When a ripple voltage in the received voltage $V_{INX}$ is less than the voltage $V_{C2}$, the comparator 515 can generate an output signal with one state, e.g., logic high. When the ripple voltage in the received voltage $V_{INX}$ is greater than the voltage $V_{C2}$, the output signal is at another state, e.g., logic low. As such, the output of the comparator 515, which is the holding signal TR2, is a pulse signal indicating that the engine is running. The holding signal TR2 is output via a terminal OUT2 to the switch control circuit 214 in FIG. 3 to further control the switch 212.

Figure 6:
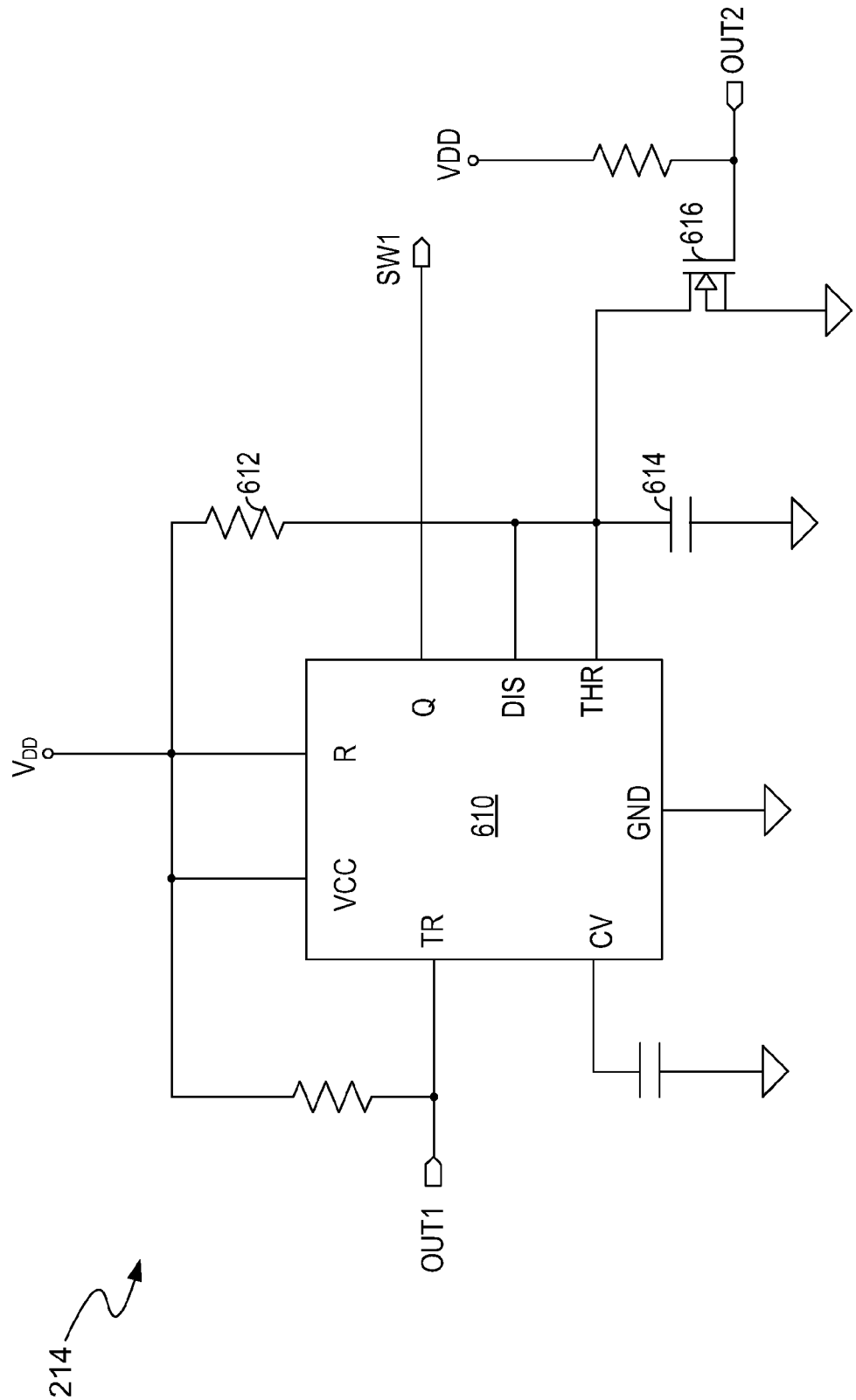
FIG. 6 shows a block diagram of an example of a switch control circuit, in accordance with one embodiment of present invention.

FIG. 6 shows a block diagram of an example of the switch control circuit 214 in FIG. 3, in accordance with one embodiment of present invention. FIG. 6 is described in combination with FIG. 3. As shown in the example of FIG. 6, the switch control circuit 214 includes a controller 610, a resistor 612, a capacitor 614, and a switch 616, e.g., a N-channel MOSFET (N-MOSFET) as shown in the example of FIG. 6.

In one embodiment, the controller 610 can be an integrated circuit (IC) which includes a first pin TR to receive the trigger signal TR1 from the engine starting-up detector 213 via the terminal OUT1, a second pin R coupled to a reference voltage $V_{DD}$, a third pin THR coupled to the drain terminal of the N-MOSFET 616 and the capacitor 614, and a fourth pin Q for providing a control signal via a terminal SW1 to control the switch 212. The N-MOSFET 616 is controlled by the holding signal TR2 from the engine running detector 215 via the terminal OUT2. The capacitor 614 can be charged by the reference voltage $V_{DD}$ via the resistor 612.

In operation, when the controller 610 receives the trigger signal TR1 indicating that the engine is starting up, the controller 610 is triggered and outputs a first control signal ON1 (e.g., logic high) to switch on the switch 212 via the terminal SW1. When the controller 610 is triggered by the trigger signal TR1, the capacitor 614 is charged by the reference voltage $V_{DD}$ via the resistor 612. In one embodiment, if the voltage $V_c$ across the capacitor 614 is equal to $V_{DD}$, the controller 610 is reset and outputs a second control signal OFF1 (e.g., logic low) to switch off the switch 212. If the controller 610 receives the holding signal TR2 indicating the vehicle is running before the capacitor 614 is charged to $V_{DD}$, then the N-MOSFET 616 is switched on and off by the pulse signal TR2. The capacitor 614 is discharged via the N-MOSFET 616 when the N-MOSFET 616 is on. Thus, the capacitor 614 will not be charged to the voltage $V_{DD}$, and the controller 610 continues to output the control signal ON1, and the switch 212 remains turned on. As such, if the controller 610 can receive the holding signal TR2 within a certain period of time after triggering (also referred to herein as the first time period), then the controller 610 can keep outputting the control signal ON1 to switch on the switch 212. Otherwise, the controller 610 outputs the second control signal OFF1 to switch off the switch 212. In one embodiment, if the engine does not successfully start up or is not running, the controller 610 will not receive the holding signal TR2 within a certain amount of time after the controller has been triggered by the TR1. In one embodiment, the first time period is the time period that the capacitor 614 is charged to the voltage $V_{DD}$. Thus, the LED light bar 204 remains on when the vehicle successfully starts up and is running.

Figure 7A:
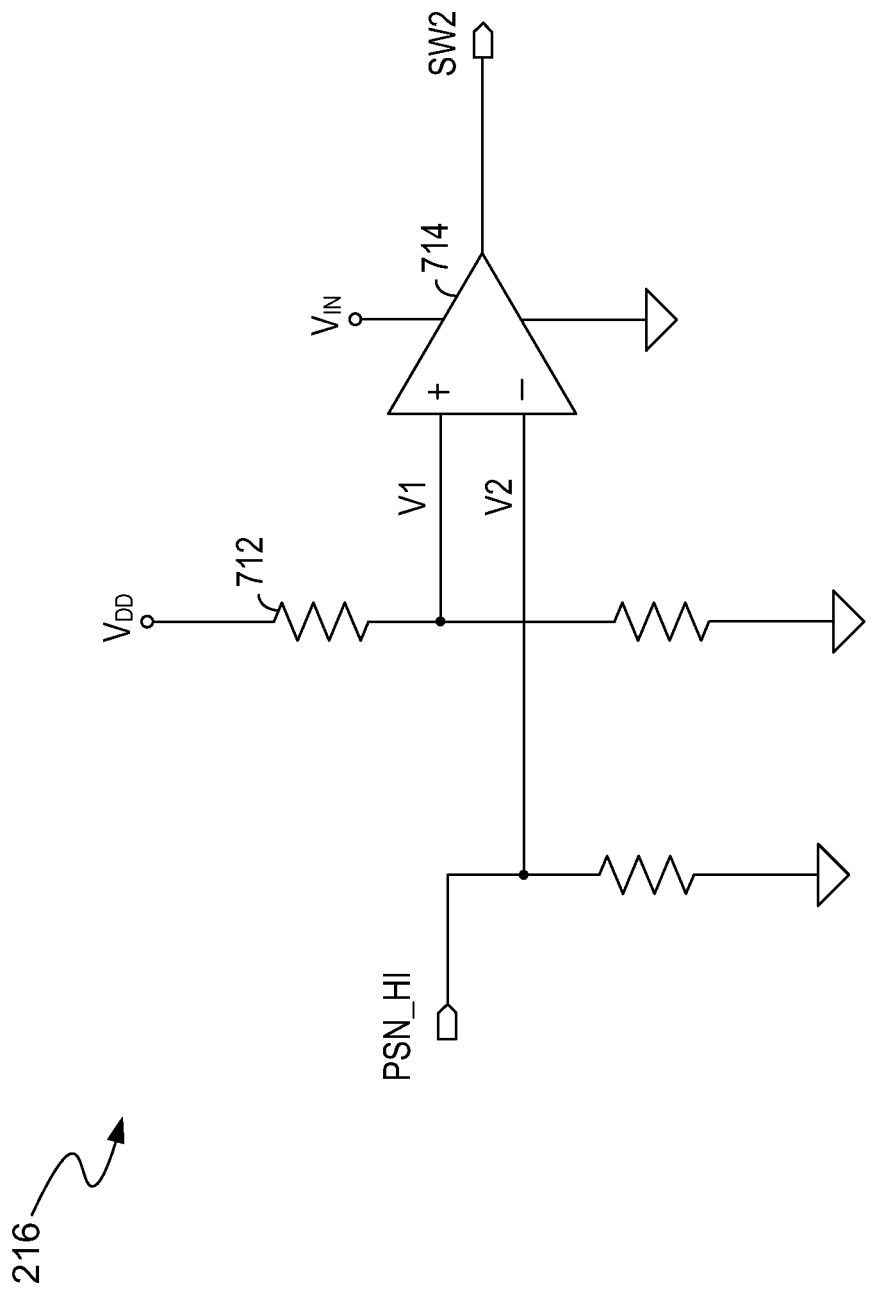
FIG. 7A shows a block diagram of an example of a position lamp signal detector, in accordance with one embodiment of present invention.

FIG. 7A shows a block diagram of an example of a position lamp signal detector 216 in FIG. 2, in accordance with one embodiment of present invention. FIG. 7A is described in combination with FIG. 3. The position lamp signal detector 216 shown in FIG. 7A can receive a high state position lamp signal when the position lamp is activated. The position lamp detector 216 includes a comparator 714. An input terminal, e.g., the non-inverting terminal, of the comparator 714 is coupled to the reference voltage $V_{DD}$ via a resistor 712. Another input terminal, e.g., the inverting terminal, of the comparator 714 receives the position lamp signal via a first terminal PSN_HI. The comparator 714 compares the input voltages V1 and V2 and outputs a control signal via the output terminal SW2 to control the switch 212.

In operation, when the position lamp is not activated, the position lamp signal is in a low state. As such, V1 is greater than V2. The output of the comparator 714 can be logic high, which can keep the switch 212 switched on. When the position lamp is activated, the position lamp signal is in a high state. As such, V2 is greater than V1. The output of the comparator 714 is logic low, which switches off the switch 212. As such, the LED light bar 204 can be turned off when the position lamp is activated.

Figure 7B:
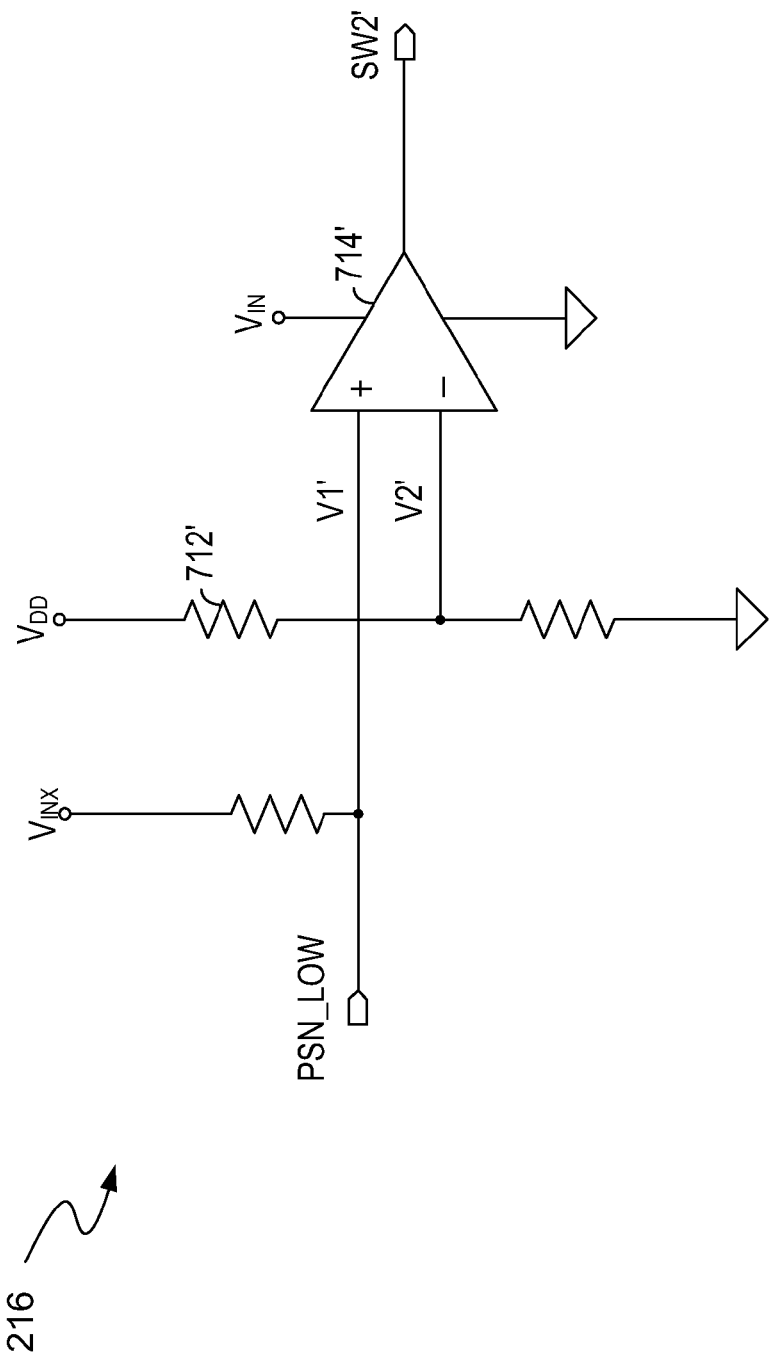
FIG. 7B shows a block diagram of an example of a position lamp signal detector, in accordance with another embodiment of present invention.

FIG. 7B shows a block diagram of an example of a position lamp signal detector 216 in FIG. 2, in accordance with another embodiment of present invention. FIG. 7B is described in combination with FIG. 3. The position lamp signal detector 216 shown in FIG. 7B can receive a low state position lamp signal when the position lamp is activated. The position lamp detector 216 includes a comparator 714'. The inverting terminal of the comparator 714' is coupled to the reference voltage $V_{DD}$ via a resistor 712'. The non-inverting terminal of the comparator 714 receives the position lamp signal via a first terminal PSN_LOW. The comparator 714' compares the input voltages V1' and V2' at the input terminals and outputs a control signal via the output terminal SW2' to control the switch 212.

In operation, when the position lamp is not activated, the position lamp signal is in a high state. As such, V1' is greater than V2'. The output of the comparator 714' can be logic high, which can keep the switch 212 switched on. When the position lamp is activated, the position lamp signal is in a low state. As such, V2' is greater than V1'. The output of the comparator 714' is logic low, which switches off the switch 212. As such, the LED light bar 204 can be turned off when the position lamp is activated.

Figure 8A:
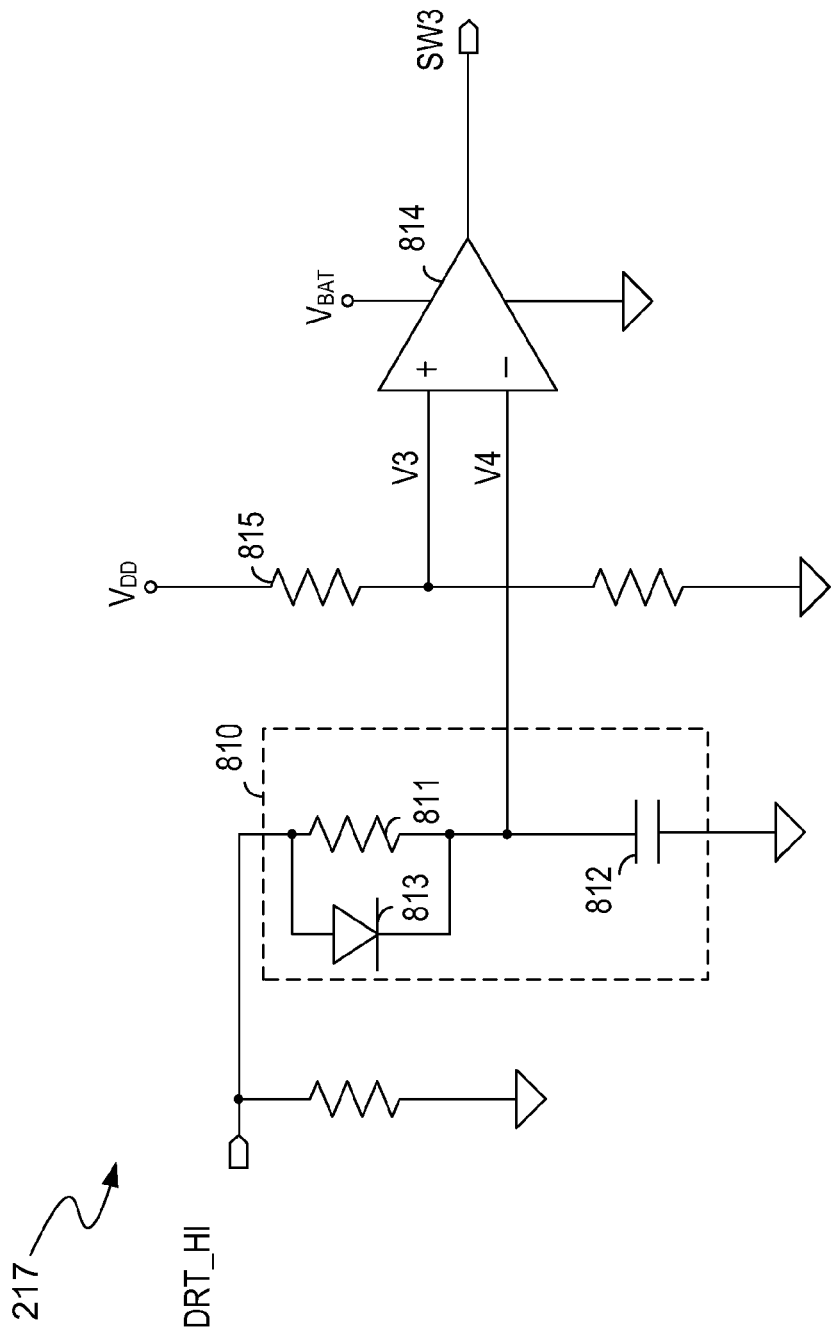
FIG. 8A shows a block diagram of an example of a direction indicator lamp signal detector, in accordance with one embodiment of present invention.

FIG. 8A shows a block diagram of an example of a direction indicator lamp signal detector 217 in FIG. 2, in accordance with one embodiment of present invention. FIG. 8A is described in combination with FIG. 3. The direction indicator lamp signal detector 217 shown in FIG. 8A can receive a low state direction indicator lamp signal when the direction indicator lamp is off. The direction indicator lamp signal detector 217 includes a comparator 814 and a delay unit 810. The delay unit 810 includes a resistor 811, a diode 813 coupled in parallel with the resistor 811, and a capacitor 812. As shown in the example of FIG. 8A, an inverting terminal of the comparator 814 receives the direction indicator lamp signal from the first terminal DRT_HI via the delay unit 810. The non-inverting terminal of the comparator 814 receives the reference voltage $V_{DD}$ via a resistor 815. The comparator 814 compares the input voltages V3 and V4 at the input terminals and outputs a control signal via the output terminal SW3 to control the switch 212.

In operation, when the direction indicator lamp is not activated, the direction indicator lamp signal is in a low state. As such, V3 is greater than V4. The output of the comparator 814 is logic high, which can keep the switch 212 switched on and the LED light bar 204 remains on. When the direction indicator lamp is activated, the direction indicator lamp flashes, and the direction indicator lamp signal is in a pulse state. When the direction indicator lamp signal with high pulse state is input, the capacitor 812 in the delay unit 810 is charged to a value greater than V3 via the diode 813 in a relatively short time period. As such, the output of the comparator 814 is logic low, which can switch off the switch 212 and, thus, the LED light bar 204 is off. When the direction indicator lamp signal with low pulse state is input, the capacitor 812 can be discharged via the resistor 811 (the diode 813 is not conducted when the low pulse state signal is provided). Discharging the capacitor 812 via the resistor 811 is slower than charging the capacitor 812 via the diode 813. Also, the duration of the low pulse state is relatively short. As a result, V4 can still be higher than V3. Thus, the output of the comparator 814 is still logic low to keep the switch 212 off, and the LED light bar 204 remains off when the direction indicator is activated. When the direction indicator lamp is turned off, the direction indicator lamp signal returns to the low state, the capacitor 812 discharges via the resistor 811, and after some amount of time has passed (also referred to herein as the second time period), V4 will be less than V3. Then, the output of the comparator 814 is logic high, which can turn on the LED light bar 204 again. Thus, after the direction indicator lamp is off for the second time period, the LED light bar 204 of the vehicle is turned on again.

Figure 8B:
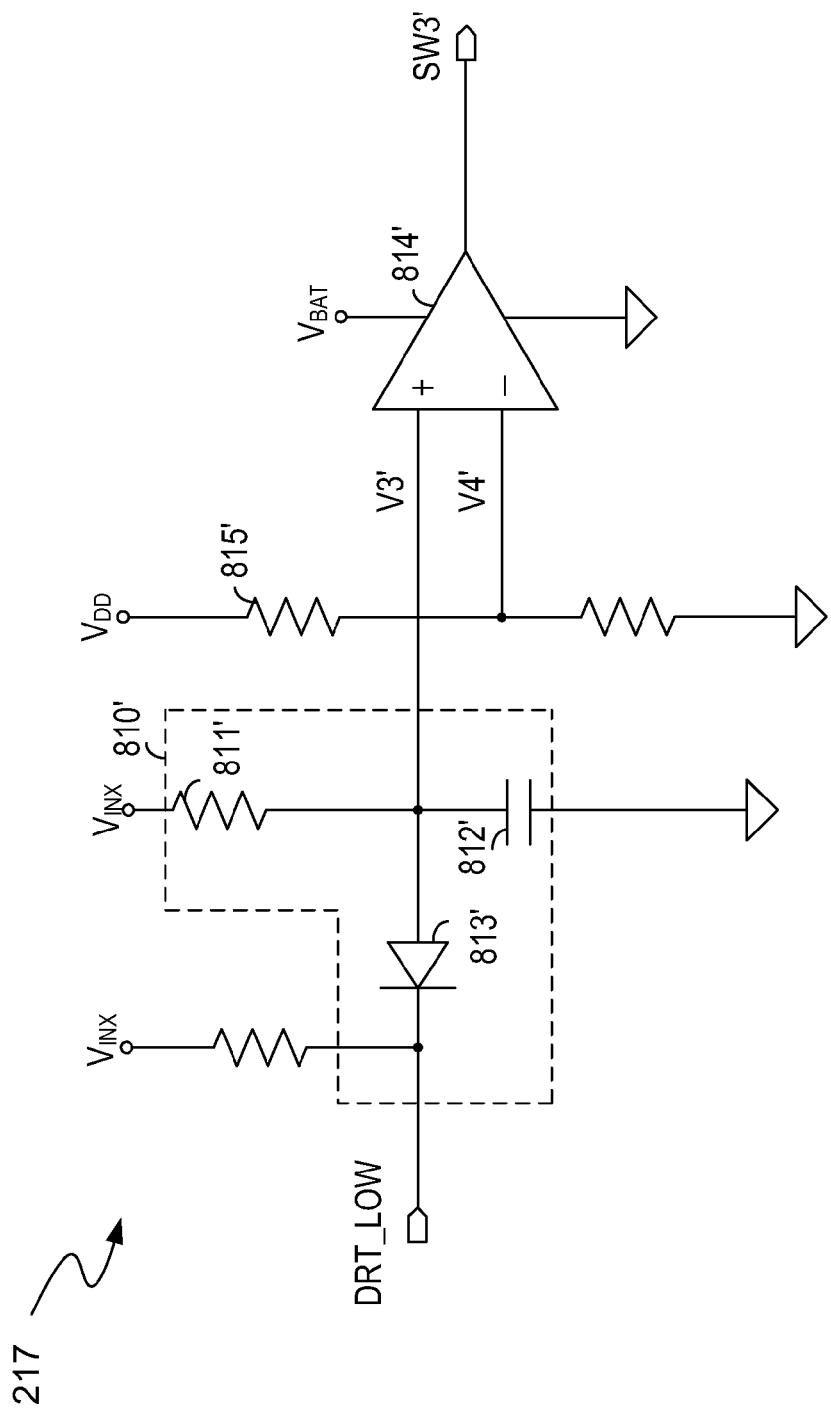
FIG. 8B shows a block diagram of an example of a direction indicator lamp signal detector, in accordance with another embodiment of present invention.

FIG. 8B shows a block diagram of an example of a direction indicator lamp signal detector 217 in FIG. 2, in accordance with another embodiment of present invention. FIG. 8B is described in combination with FIG. 3. The direction indicator lamp signal detector 217 shown in FIG. 8B can receive a high state direction indicator lamp signal when the direction indicator lamp is off. The direction indicator lamp signal detector 217 includes a comparator 814' and a delay unit 810'. The delay unit 810' includes a resistor 811', a diode 813' coupled in series with the resistor 811', and a capacitor 812'. As shown in the example of FIG. 8B, a non-inverting terminal of the comparator 814' receives the direction indicator lamp signal from the first terminal DRT_LOW via the delay unit 810'. The inverting terminal of the comparator 814' receives the reference voltage $V_{DD}$ via a resistor 815'. The comparator 814' compares the input voltages V3' and V4' at the input terminals and outputs a control signal via the output terminal SW3' to control the switch 212.

In operation, when the direction indicator lamp is not activated, the direction indicator lamp signal is in a high state. The capacitor 812' in the delay unit 810' is charged to $V_{INX}$. As such, V3' is greater than V4'. The output of the comparator 814' is logic high, which can keep the switch 212 switched on. When the direction indicator lamp is activated, the direction indicator lamp flashes, and the direction indicator lamp signal is in a pulse state. When the direction indicator lamp signal with low pulse state is input, the capacitor 812' in the delay unit 810' is discharged via the diode 813' in a relatively short time period. Consequently, V3' decreases to less than V4' in a relatively short time. As such, the output of the comparator 814 is logic low, which switches off the switch 212. When the direction indicator lamp signal with high pulse state is input, the capacitor 812' can be charged via the resistor 811' (the diode 813' is not conducted when the high pulse state signal is provided). Charging the capacitor 812' is slower than discharging the capacitor 812' via the diode 813. Also, the duration of the high pulse state is relatively short. As a result, V4' can still be higher than V3', and the output of the comparator 814' is still logic low to keep the switch 212 off, and the LED light bar 204 remains off when the direction indicator is activated. When the direction indicator lamp is turned off, the direction indicator lamp signal returns to the high state, and the capacitor 812' is charged via the resistor 811'. After a certain amount of time has passed (also referred to herein as the third time period), V3' will be greater than V4'. Then the output of the comparator 814' is logic high, which can turn on the LED light bar 204 again. Thus, after the direction indicator lamp is off for the third time period, the LED light bar 204 of the vehicle is turned on again.

Figure 9:
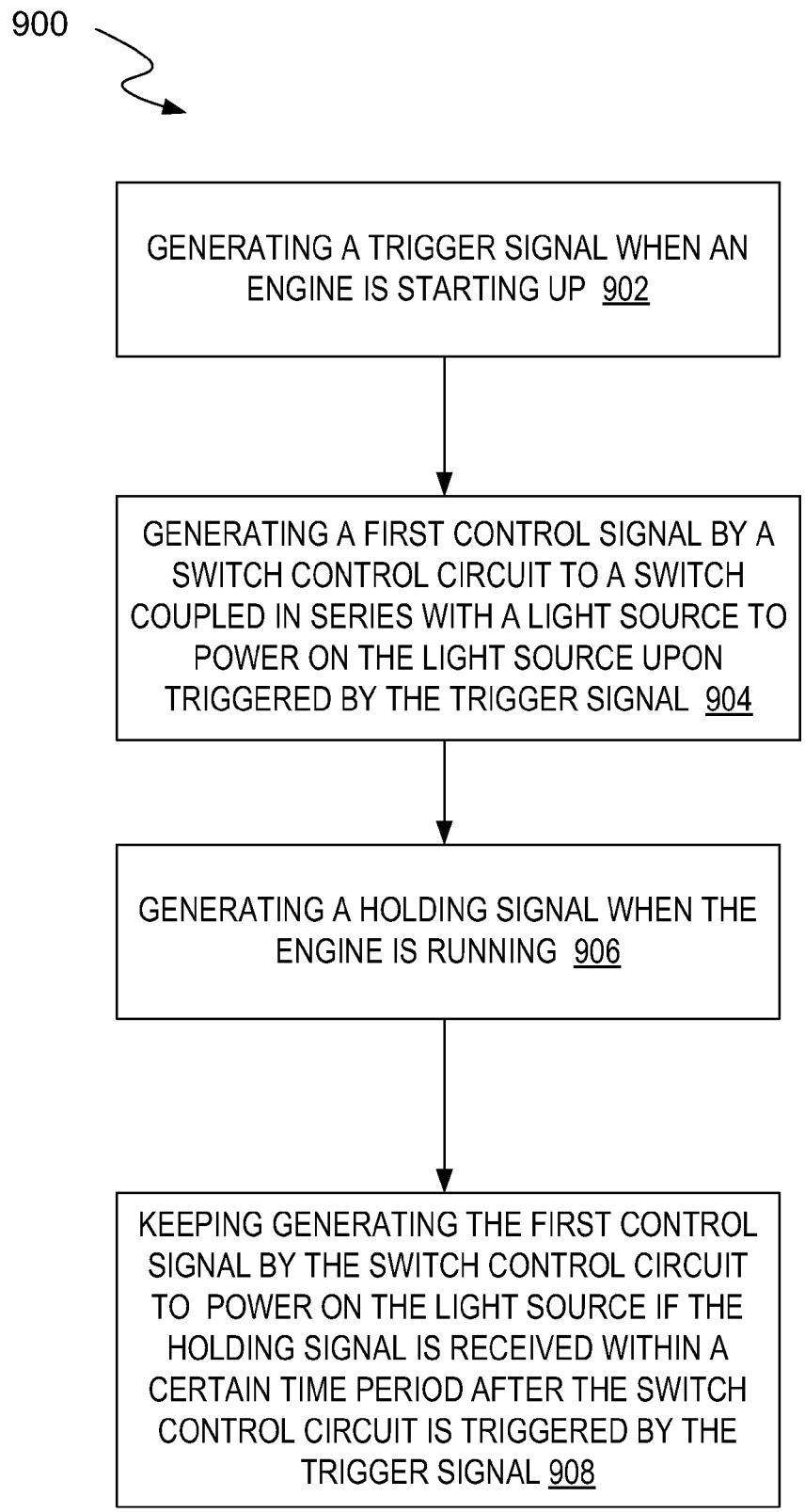
FIG. 9 shows a flowchart of an example of operations performed by a DRL controller, in accordance with one embodiment of present invention.

FIG. 9 shows a flowchart of an example of operations 900 performed by a DRL controller 210 in FIG. 3, in accordance with one embodiment of present invention. FIG. 9 is described in combination with FIG. 3.

In block 902, an engine starting-up detector 213 in the DRL controller 210 generates a trigger signal TR1 when an engine of the vehicle is starting up. In one embodiment, when the engine is starting up, there is a high voltage drop in the battery voltage $V_{BAT}$ in a relatively short time. The engine starting-up detector 213 detects that the engine is starting up by monitoring the voltage drop in the battery voltage $V_{BAT}$, and generates the trigger signal TR1 when the engine is starting up.

In block 904, a switch control circuit 214 in the DRL controller 210 generates a first control signal ON1 to a switch 212 coupled in series with a DRL light source, e.g., a DRL LED light bar 204 (shown in FIG. 2), of the vehicle in response to the trigger signal TR1. Consequently, the LED light bar 204 is powered on. In one embodiment, the switch control circuit 214 is trigged by the trigger signal TR1 and generates the first control signal ON1 to switch on the switch 212, and thus the LED light bar 204 is powered on when the engine is starting up.

If the engine successfully starts up and is running, an engine running detector 215 in the DRL controller 210 can generate a holding signal TR2 as shown in the block 906. In one embodiment, when the engine is running, there are multiple ripple voltages in the battery voltage $V_{BAT}$. The engine running detector 215 monitors the battery voltage $V_{BAT}$ to detect if the engine is running, and generates the holding signal TR2 to the switch control circuit 214. In one embodiment, the holding signal TR2 is a pulse signal.

In block 908, the switch control circuit 214 in the DRL controller 210 keeps generating the first control signal ON1 to power on the DRL LED light bar 204 if the holding signal TR2 is received within a certain period of time (also referred to herein as the first time period) after the switch control circuit 214 is triggered. In one embodiment, the first time period is the time period during which a capacitor 614 (shown in FIG. 6) in the switch control circuit 214 is charged to a value that can reset a controller 610 (shown in FIG. 6) in the switch control circuit 214. In one embodiment, if the holding signal TR2 is received by the switch control circuit 214 within the first time period after the controller 610 is triggered, a switch 616 (shown in FIG. 6) in the switch control circuit 214 can be switched on and off in response to the pulse signal TR2. Consequently, the capacitor 614 is charged when the switch 616 is off and discharged when the switch 616 is on. Thus, the voltage across the capacitor 614 will not be charged to the value that can reset the controller 610 and, as such, the switch control circuit 214 keeps generating the first control signal ON1 to switch on the switch 212. As such, the daytime running light remains on if the engine in the vehicle is running.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A daytime running lamp (DRL) controller for controlling power to a light source of a vehicle, said controller comprising:
a switch coupled to said light source;
an engine starting-up detector coupled to said switch and operable for generating a trigger signal if said engine is starting up; and
a switch control circuit coupled to said switch and said engine starting-up detector, and comprising a controller operable for generating a first control signal to switch on said switch to power on said light source responsive to receiving said trigger signal, and to keep outputting said first control signal if a holding signal is received by said switch control circuit within a first time period after said trigger signal is received, wherein said first time period is a time period during which said controller is reset after receiving said trigger signal.

2. The DRL controller of claim 1, further comprising:
an engine running detector coupled to said switch control circuit, and operable for generating said holding signal to said switch control circuit when said engine is running.

3. The DRL controller of claim 1, wherein said switch control circuit further comprises:
an energy storage device coupled to said controller; and
a discharge switch coupled to said energy storage device and operable for receiving said holding signal from said engine running detector.

4. The DRL controller of claim 3, wherein said energy storage device starts charging when said switch control circuit is triggered by said trigger signal.

5. The DRL controller of claim 4, wherein said controller generates a second control signal to switch off said switch when said energy storage device is charged to a specified voltage.

6. The DRL controller of claim 3, wherein said discharge switch is switched on and off when said switch control circuit receives said holding signal, and wherein said energy storage device discharges through said discharge switch when said discharge switch is on.

7. The DRL controller of claim 1, further comprising:
a position lamp signal detector coupled to said switch, and operable for receiving a first indication signal and for generating a second control signal to said switch to power off said light source in response to said first indication signal.

8. The DRL controller of claim 7, wherein said first indication signal indicates a status of a position lamp.

9. The DRL controller of claim 1, further comprising:
a direction indicator lamp signal detector coupled to said switch, and operable for receiving a second indication signal and generating a second control signal to said switch to power off said light source in response to said second indication signal.

10. The DRL controller of claim 9, wherein said second indication signal indicates a status of a direction indicator lamp.

11. The DRL controller of claim 10, wherein said direction indicator lamp signal detector turns on said switch after said direction indicator lamp is turned off.

12. A system comprising:
a light source;
a battery terminal operable for receiving power from a battery in a vehicle; and
a light source controller coupled to said light source, and operable for monitoring a voltage of said battery to detect if an engine of said vehicle is starting up,
wherein said light source controller comprises a controller operable for generating a first control signal to power on said light source if said engine is started, and that keeps outputting said first control signal if a holding signal is received by said controller within a first time period after said engine starts, wherein said first time period is a time period during which said controller is reset after said engine starts.

13. The light source system of claim 12, wherein said light source controller further comprises an engine running detector operable for monitoring said voltage of said battery to detect if said engine is running, and for generating said holding signal if said engine is running.

14. The light source system of claim 12, wherein said light source controller further comprises a position lamp signal terminal operable for receiving a first indication signal, and wherein said light source controller is operable for generating a second control signal to power off said light source in response to said first indication signal.

15. The light source system of claim 14, wherein said first indication signal indicates that a position lamp in said vehicle is turned on.

16. The light source system of claim 12, wherein said light source controller further comprises a direction indicator lamp signal terminal operable for receiving a second indication signal, and wherein said light source controller is operable for generating a second control signal to power off said light source in response to said second indication signal.

17. The light source system of claim 16, wherein said second indication signal indicates that a direction indicator lamp in said vehicle is turned on.

18. The light source system of claim 12, wherein said light source comprises a light emitting diode (LED) light bar.

19. A method for controlling power to a light source in a vehicle, comprising:
generating a trigger signal when an engine of said vehicle is starting up;
generating a first control signal by a controller to power on said light source when said controller is triggered by said trigger signal;
generating a holding signal after said engine is started and is running; and
continuing to generate said first control signal by said controller to power on said light source if said holding signal is received by said controller within a first time period after said controller is triggered by said trigger signal, wherein said first time period is a time period during which said controller is reset after being triggered by said trigger signal.

20. The method of claim 19, further comprising:
receiving a first indication signal indicative of a status of a position lamp; and generating a second control signal to said switch to power off said light source in response to said first indication signal.

21. The method of claim 19, further comprising:

receiving a second indication signal indicative of a status of a direction indicator lamp; and generating a second control signal to said switch to power off said light source upon receiving said second indication signal.

22. The method of claim 21, further comprising:

powering on said light source after said direction indicator lamp is turned off.

* * * * *